(12) United States Patent
Gossmann et al.

(10) Patent No.: US 7,587,533 B2
(45) Date of Patent: Sep. 8, 2009

(54) DIGITAL PROGRAMMING INTERFACE BETWEEN A BASEBAND PROCESSOR AND AN INTEGRATED RADIO-FREQUENCY MODULE

(75) Inventors: Timo Gossmann, Neubiberg (DE); Johannes Stögmüller, Linz (AT)

(73) Assignee: Infineon Technologies AG, Munich (DE)

( * ) Notice: Subject to any disclaimer, the term of this patent is extended or adjusted under 35 U.S.C. 154(b) by 366 days.

(21) Appl. No.: 11/220,453

(22) Filed: Sep. 7, 2005

(65) Prior Publication Data

US 2006/0059280 A1    Mar. 16, 2006

(30) Foreign Application Priority Data

Sep. 8, 2004    (DE) ...................... 10 2004 043 520

(51) Int. Cl.
*G06F 3/00* (2006.01)
(52) U.S. Cl. .......................... 710/58; 710/20
(58) Field of Classification Search ................ 710/20
See application file for complete search history.

(56) References Cited

U.S. PATENT DOCUMENTS 5,555,025 A    9/1996  McArthur
5,859,878 A *  1/1999  Phillips et al. .............. 375/316
6,484,253 B1 * 11/2002 Matsuo ....................... 712/212
2002/0009983 A1   1/2002  Pritchett et al.
2002/0156539 A1  10/2002  Ahn

FOREIGN PATENT DOCUMENTS

| EP | 1 213 657 A2 | 6/2002 |
| EP | 1213657 A2 * | 6/2002 |
| WO | WO 00/42744 A1 | 7/2000 |
| WO | WO 02/13186 A2 | 2/2002 |
| WO | WO 02/067450 A2 | 8/2002 |

OTHER PUBLICATIONS

XP-002325710. DigRF Baseband/RF digital Interface Specification, Logical, Electrical and Timing Characteristics, EGPRS Version 1.12, Digital Interface working Group, 32 pgs. pub. Feb. 20, 2004.

* cited by examiner

*Primary Examiner*—Henry W. H. Tsai
*Assistant Examiner*—John B Roche
(74) *Attorney, Agent, or Firm*—Eschweiler & Associates, LLC

(57) ABSTRACT

A circuit receives a clock signal, a data word which is emitted from a control device and has information about a read or write access to the circuit, and an enable signal which is at a predetermined value during the transmission of the data word. A determination unit uses the number of clock cycles of the clock signal during which the enable signal is at the predetermined value to determine the digital interface standard on which the data word transmitted during these clock cycles is based.

21 Claims, 3 Drawing Sheets

DIGITAL PROGRAMMING INTERFACE BETWEEN A BASEBAND PROCESSOR AND AN INTEGRATED RADIO-FREQUENCY MODULE

REFERENCE TO RELATED APPLICATIONS

This application claims the benefit of the priority date of German application DE 10 2004 043 520.0, filed on Sep. 8, 2004, the contents of which are herein incorporated by reference in their entirety.

FIELD OF THE INVENTION

The invention relates to a circuit having a digital interface for communication with a control device. Communication via the interface may be based on various digital interface standards, such as the 3W Standard or the DigRF Standard. The invention also relates to a system having a circuit, a control device and a digital interface arranged between them, and to a corresponding method.

BACKGROUND OF THE INVENTION

The operation of modern integrated radio-frequency modules for mobile radio is no longer driven via control lines and, instead, they communicate with a control module (host) via a serial programming interface. The baseband processor is in this case in general the control module. A three-conductor system with a clock line, a data line and an enable line has become established for the interface between the control module and the integrated radio-frequency module. In the specialist literature, the enable line is frequently also referred to as the strobe line.

The so-called 3W Standard has been issued as a quasi standard for communication via an interface such as this. All of the communication is controlled and driven by the control module in accordance with the 3W Standard. When it is intended to transfer data from the control module to the integrated radio-frequency module, the control module activates the enable line, that is to say it sets the enable line to a specific, predetermined value. The control module then emits a clock on the clock line and the data bits in serial form in synchronism with this on the data line. As soon as the enable line is reset again, the output of the clock pulses and bits is stopped. The bits emitted during an active phase of the enable line form a so-called message. The number of bits emitted per message corresponds to the number of clock cycles during which the enable line is activated. The bits are, as far as possible, emitted such that the clock flank or rising edge always occurs in the centre of one bit period at the radio-frequency module. The radio-frequency module in each case receives the bits with this flank, provided that the enable line is activated.

A message contains both data bits and address bits. In the 3W Standard, the address bits are normally arranged at the end of a message. However, this does not represent any restriction, and the arrangement of the address bits within the message is not of importance.

The DigRF Standard has been developed because no data can be read on the data line from the radio-frequency module in the 3W Standard. An interface based on the DigRF Standard comprises a control part and a data part. The data interface is required only when the baseband processor cannot interchange the transmission data and received data in the normal analogue form with the integrated radio-frequency module. However, an interface for the control information is always required. In precisely the same way as in the 3W Standard, this interface in the DigRF Standard is in the form of a bus with three lines, that is to say a clock line, a data line and an enable line. The protocol which is used to transfer data via the interface in the DigRF Standard is not the same as the protocol in the 3W Standard.

The DigRF Standard defines a maximum protocol length of 32 bits, which is made up as follows. After the activation of the enable line by the control module, the control module first of all produces a read/write bit (R/W bit) on the data line, which indicates to the integrated radio-frequency module whether data is intended to be programmed into the integrated radio-frequency module or to be read from it. The control module then transmits a variable length address via the data line. In the case of a write access, this is then followed by the transmission of data bits. The number of data bits per message can in principle be chosen as required, provided that the number of data bits does not exceed the maximum value of 32−1−(number of address bits).

In the case of a read access, the enable line is reset by the control module once the address bits have been sent. However, the control module continues to emit clock pulses on the clock line and, starting with the third clock flank after the last address bit, waits for data from the integrated radio-frequency module.

The major differences between the 3W Standard and the DigRF Standard are shown in a summarized form in the following text. The 3W Standard allows only write accesses to the integrated radio-frequency module, while read accesses are also possible in the DigRF Standard. With the same number of data bits and address bits, a DigRF message comprises one bit more than the 3W Standard, owing to the read/write bit. The address bits are normally arranged at the end of a message in the 3W Standard, and at the start of a message in the DigRF Standard.

Since two different standards are now available for communication between the control module and the radio-frequency module, it is desirable to provide a capability which makes it possible for a radio-frequency module to interact not only with control modules operating in accordance with the 3W Standard but also with control modules operating in accordance with the DigRF Standard.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The present invention is directed to an integrated radio-frequency module that interacts with control modules operating in accordance with multiple standards such as the 3W Standard and the DigRF Standard, and a method that serves the same purpose.

The circuit according to the invention has three inputs and one determination unit. A clock signal is received at a first input. A second input is used to receive and emit a data word which is emitted from a control device. The data word contains information about a read or write access, by means of which data is intended to be read from the circuit or to be written to the circuit. The circuit advantageously has a memory unit for this purpose. An enable signal is received at a third input. The enable signal is at a predetermined value during precisely that time interval during which the data word is being received by the circuit. The enable signal is at a different value outside this time interval.

The determination unit determines the time period which is required in order to receive the data word at the third input. For this purpose, the determination unit counts the number of clock cycles of the clock signal during which the enable signal is at the predetermined value. The determination unit uses the number of clock cycles obtained in this way to determine the digital interface standard on which the received data word is based.

In order to allow the determination unit to distinguish between the digital interface standards, the data words which are transmitted from the control unit to the circuit according to the invention must differ in terms of the digital interface standard on which they are in each case based. To be precise, the data words must differ such that it is possible to deduce the digital interface standard on which they are based from the respective transmission duration.

One advantage of the invention is that the internal functionality of the circuit according to the invention need not depend on the interface with the control device; that is to say the number, the content, the addresses and the length of the internal registers which, in particular, can be written to does not change for the circuit according to the invention when, for example, it is driven via a 3W bus or a DigRF bus. The circuit according to the invention therefore need not be designed from the start for a specific digital interface standard, but can be used universally for different digital interface standards.

In order to allow the determination unit to distinguish between the digital interface standards on which the received data words are based, it is advantageous for the word lengths of the data words to depend on the digital interface standards on which they are based. One or more word lengths are, in one example, uniquely associated with each digital interface standard which may be used for the transmission of the data word. This measure ensures that the determination unit can use the word length of the received data word to deduce the interface standard on which it is based, when the data rate is fixed.

Furthermore, it is advantageous to design the determination unit such that, on the basis of the number of clock cycles of the clock signal during which the enable signal is at the predetermined value, it can also determine whether a read or a write access to the circuit according to the invention is associated with the data word received during these clock cycles.

In order to make it possible to distinguish between a read access or write access, in one example, the word length of the data word depends on the nature of the access.

The measures described above can also advantageously be combined with one another. Each combination of digital interface standards and access type can thus be assigned a specific value length, so that, on reception of a data word, the determination unit can unambiguously determine both the interface standard on which it is based and the type of access.

A further embodiment of the circuit according to the invention provides for the determination unit to have the capability to use the number of clock cycles of the clock signal during which the enable signal is at the predetermined value to also determine whether an error has occurred during the transmission of the data word. This may be done, for example, by predetermining a number of possible word lengths. If a data word with a different word length is received, an error must accordingly have occurred during the transmission of this data word.

Furthermore, it is possible to provide for the data word to contain address information. The address information indicates the address at which the data to be read or to be written is stored, or is intended to be stored, within the circuit. In particular, each data word contains a predetermined number of address bits, that is to say the number of address bits is the same, irrespective of the digital interface standard and irrespective of the type of access for each data word. A constant number of address bits makes it easier to process the address information, since the processing can be carried out independently of the interface and access.

According to a further embodiment of the circuit according to the invention, the data word—when data is intended to be written to the circuit according to the invention—contains the data to be written. In particular, in the case of a read access, each data word contains a predetermined number of data bits. In consequence, the data bits can be processed independently of the interface standard.

It is also advantageous for a data word to have control information, which indicates whether a read access or a write access is intended to be carried out. Control information such as this is, however, required only when the digital interface standard used as the basis, such as the DigRF Standard, allows both read and write accesses. In the case of an interface standard which provides only write access, such as the 3W Standard, there is no need for the control information. In the case of the DigRF Standard, the control information comprises the read/write bit.

If control information is provided, the control information can advantageously also be used by the determination unit using the control information to determine whether an error has occurred during the transmission of the data word.

The circuit according to the invention comprises, in one example, a shift register to which a received data word is written. The data word can be read from the shift register again for further processing, as soon as the determination unit has determined the interface standard on which it is based and the type of access to the circuit according to the invention.

The clock signal is advantageously produced by the control device in one embodiment.

The digital interface standards which may be used for transmission of the data words between the control device and the circuit according to the invention is the 3W Standard or the DigRF Standard, in one example.

The circuit according to the invention can be integrated on a common substrate and, in particular, may be a radio-frequency circuit used in the mobile radio field. Furthermore, the control device may be a host which, in particular, is a baseband processor designed for mobile radio. Other applications, however, are also contemplated by the present invention.

The system according to the invention is used for production of read or write accesses. For this purpose, the system according to the invention has the control device already mentioned above and a circuit according to the invention. The control device produces a data word, which has information about a read or write access to the circuit. This data word is received by the circuit. The circuit—as already mentioned above—then uses the data word and its reception duration to determine the digital interface standard that has been used to transmit the data word.

The method according to the invention is used to determine the digital interface standard on which a read access or write access by a control device to a circuit is based. For this purpose, the method according to the invention comprises: (a) reception of a clock signal by the circuit; (b) reception of a data word by the circuit, with the data word being emitted from the control device and having information about a read or write access to the circuit; (c) reception of an enable signal by the circuit, with the enable signal being at a predetermined value during the transmission of the data word; and (d) determination of the digital interface standard on which the transmitted data word is based, on the basis of the number of clock cycles of the clock signal during which the enable signal is at the predetermined value.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in more detail in the following text using examples and with reference to the drawings, in which.

DETAILED DESCRIPTION OF THE INVENTION

Figure 1:
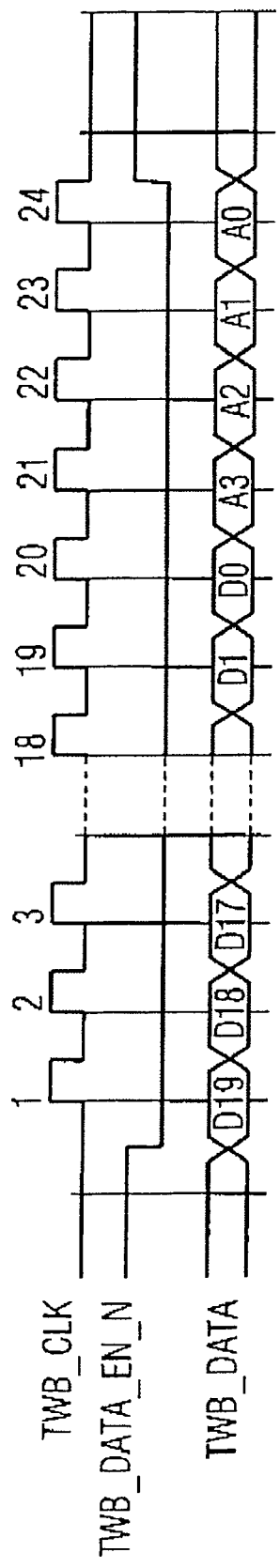
FIG. 1 is a timing diagram illustrating the transmission of a message using the 3W Standard.

FIG. 1 illustrates, schematically, the protocol for transmission of a message from a control module to an integrated radio-frequency module using the 3W Standard. As can be seen from FIG. 1, the control module emits a clock pulse TWB_CLK at the start of the emission of an enable signal TWB_DATA_EN_N. Furthermore, the bits of the message TWB_DATA are emitted via a data line. The number of bits in the message TWB_DATA corresponds to the number of emitted clock pulses TWB_CLK. In the present case, the message TWB_DATA has a length of 24 bits, with 20 bits being used for the data, and 4 bits for the address.

The clock pulses TWB_CLK are emitted in such a way that, as far as possible, the clock flank or rising edge at the integrated radio-frequency module always occurs in the middle of a bit period. The integrated radio-frequency module receives the data bit with this flank, provided that the enable signal TWB_DATA_EN_N is activated.

As soon as the transmission of the bits of the message TWB_DATA has been completed, the enable signal TWB_DATA_EN_N is reset again, and the clock signal TWB_CLK is stopped.

Figure 2:
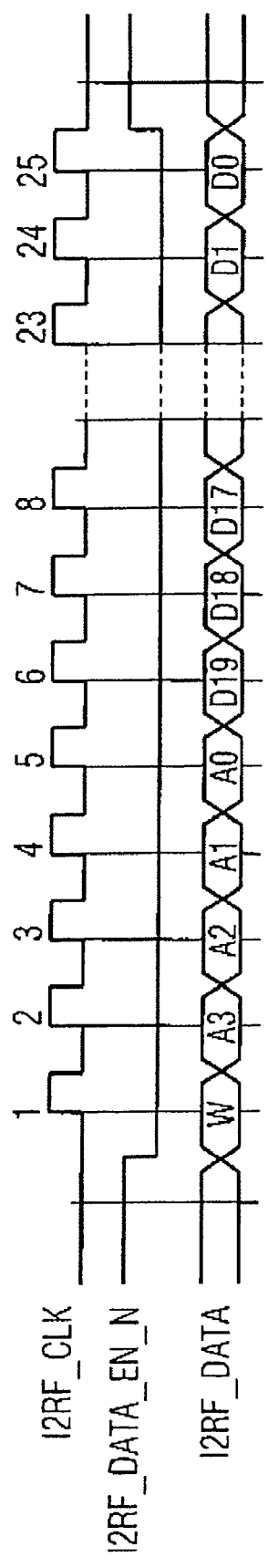
FIG. 2 is a timing diagram illustrating a write access using the DigRF Standard.

FIG. 2 shows, schematically the protocol for a write access by a control module to an integrated radio-frequency module using the DigRF Standard. The clock signal I2RF_CLK shown in FIG. 2 and the enable signal I2RF_DATA_EN_N respectively correspond essentially to the clock signal TWB_CLK and the enable signal TWB_DATA_EN_N shown in FIG. 1.

In the present case, 20 data bits and 4 address bits are transmitted by means of a message I2RF_DATA, but in contrast to the 3W protocol of FIG. 1, the sequence of the data bits and address bits are interchanged, with the address bits transferred before the data bits. A further difference from the 3W Standard is represented by the read/write bit which is emitted at the start of a message I2RF_DATA. Since the access illustrated in FIG. 2 is a write access to the integrated radio-frequency module, there is a write bit W at the start of the message I2RF DATA.

Figure 3:
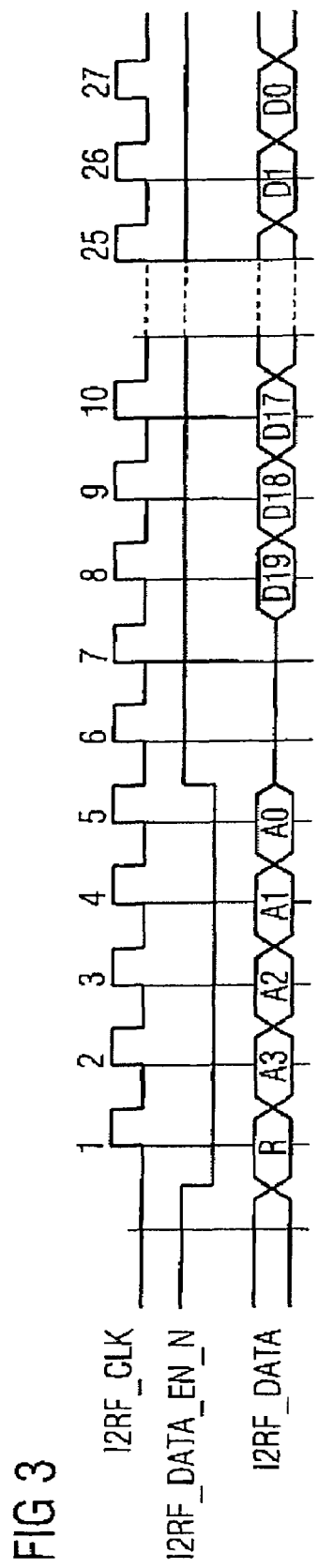
FIG. 3 is a timing diagram illustrating a read access using the DigRF Standard.

FIG. 3 shows, schematically, the protocol for a read access by a control module to an integrated radio-frequency module using the DigRF Standard. At the start of a read access, the control module emits a read bit R. Once the address bits have been emitted, the enable signal I2RF_DATA_EN_N is reset again. However, the control module continues to emit the clock signal I2RF CLK. Starting with the third clock flank or rising edge after the last address bit A0, the integrated radio-frequency module emits data bits which the control module receives with the rising flank of the clock signal I2RF-CLK.

Figure 4:
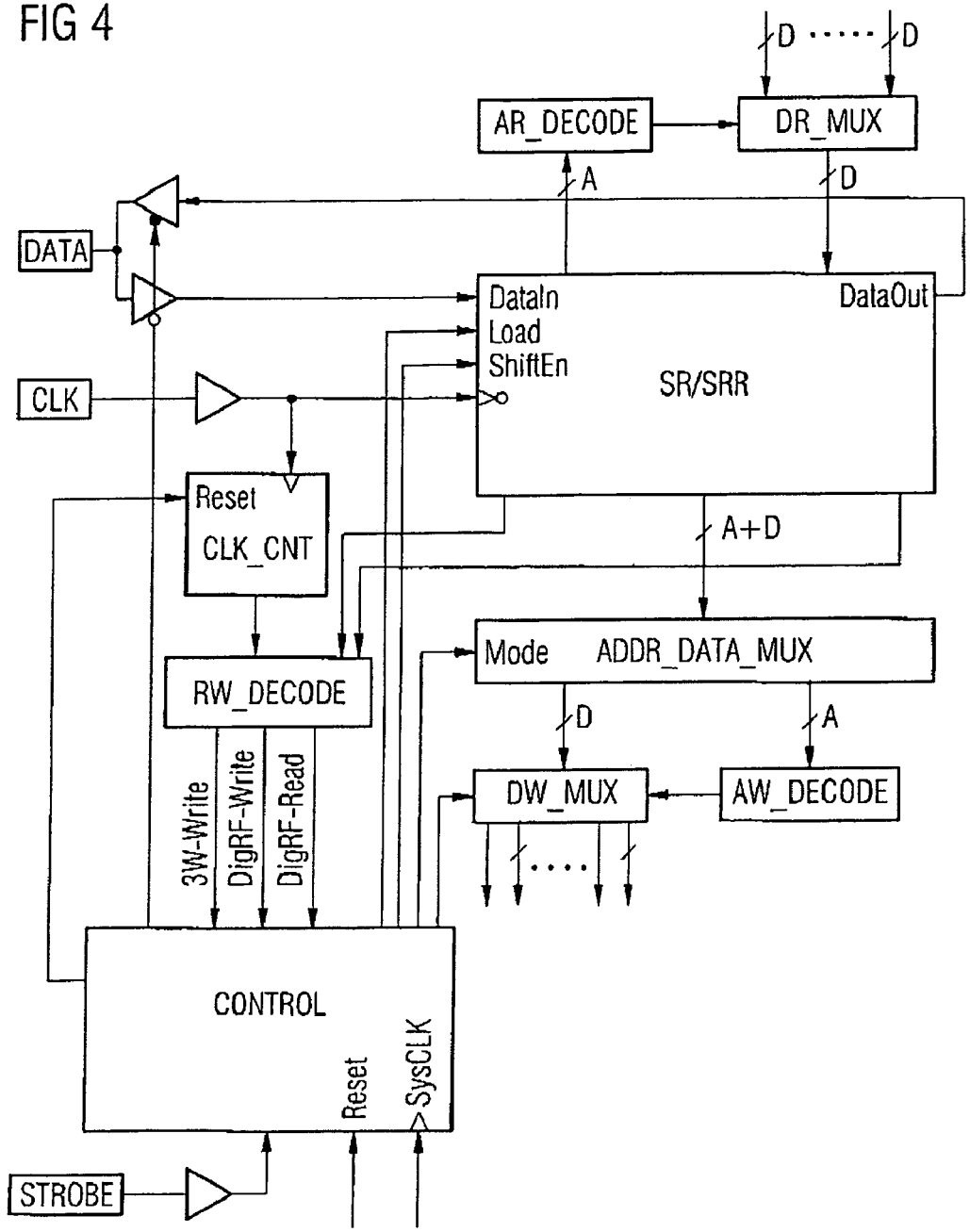
FIG. 4 is a block diagram of an interface, which is arranged in an integrated radio-frequency module, for communication with a baseband processor, as one exemplary embodiment of the invention.

FIG. 4 is a block diagram illustrating a part of an integrated radio-frequency module as one exemplary embodiment of the integrated circuit according to the invention. Inputs CLK and STROBE as well as a combined input and output DATA of the integrated radio-frequency module form a serial programming interface for a baseband processor, which is not illustrated in FIG. 4, as the control module. The communication via this serial programming interface can take place using the 3W Standard or the DigRF Standard. The respective clock signal TWB_CLK or I2RF_CLK is entered in the input CLK, and the respective enable signal TWB_DATA_EN_N or I2RF_DATA_EN_N is entered in the input STROBE. The input and output DATA is used for inputting and outputting the respective data items TWB_DATA and I2RF_DATA.

After activation of the respective enable signal TWB-DATA EN_N or I2RF_DATA_EN_N which is applied to the input STROBE, by the baseband processor, the integrated radio-frequency module reads a number of bits, which number corresponds to the number of clock pulses TWB-CLK or I2RF_CLK, respectively, received via the input CLK during the activation of the respective enable signal TWB DATA_EN_N or I2RF_DATA_EN_N, from the input DATA to a shift register SR. A clock counter CLK_CNT in this case counts the number of clock pulses TWB_CLK or I2RF_CLK, respectively. After the deactivation of the respective enable signal TWB-DATA_EN_N or I2RF_DATA_EN_N, an evaluation unit RW-DECODE evaluates the state of the clock counter CLK-CNT.

The data transfer via the present serial programming interface is dependent on the number N of data bits and of address bits being constant, irrespective of the protocol standard. This means that a message using the 3W Standard always has the length N, while a write access using the DigRF Standard has a length of N+1, since a write bit W is also transmitted, in addition to the data and address bits. In contrast, in the case of a read access using the DigRF Standard, the enable signal I2RF DATA_EN_N received at the input STROBE is activated only during A+1 bits or clock cycles I2RF_CLK, where A is the number of address bits.

On the basis of the above cases, the values N, N+1 and A+1 are valid values for the state of the clock counter CLK_CNT once the respective enable signal TWB_DATA_EN_N or I2RF_DATA_EN_N at the input STROBE has been reset again. All other values indicate that a bus cycle has been carried out incorrectly and may, for example, initiate specific error treatment.

On the basis of the unambiguous association of the three possible valid counts of the clock counter CLK_CNT, the evaluation unit RW_DECODE can use the state of the clock counter CLK_CNT after completion of the active phase of the respective enable signal TWB_DATA_EN_N or I2RF_DATA EN_N to deduce the protocol standard on which the data transfer is based. If this is the DigRF Standard, the evaluation unit RW_DECODE can also distinguish between read and write accesses.

The length of the shift register SR may be, for example, N or N+1. If the shift register SR has a length of only N bits, the first transmitted read/write bit R/W in the case of the DigRF Standard is shifted out at the end of the shift register SR on reception of the last data bit, and is lost. This can be tolerated, since the read and write accesses can be distinguished by the clock cycles that are also counted. However, it is more advantageous for the shift register SR to be designed to be one bit longer, that is to say with a length of N+1 bits, and for the read/write bit R/W not to be thrown away. The read/write bit R/W can then additionally be included in the consistency test for a bus cycle having taken place correctly in one embodiment.

Once the evaluation unit RW_DECODE has identified whether the 3W Standard or the DigRF Standard is being used, an address/data multiplexer unit ADDR_DATA_MUX which is connected downstream from the shift register SR can, in the case of a write access, pass on the respectively correct part of the received respective message TWB_DATA or I2RF_DATA to its address and data lines that are arranged on the output side. In particular, in this case, it should be noted, in contrast to the 3W Standard, that the address bits are transmitted before the data bits in the DigRF Standard. The address bits are passed on to an address decoder AW-DECODE, and the data bits are supplied to a data multiplexer unit DW_MUX. Depending on the address determined by the address decoder AW_DECODE, the data multiplexer unit DW_MUX passes on the received data bits with a transfer signal to the selected internal destination register.

In the case of a valid read access using the DigRF Standard, that is to say when the count of the clock counter CLK_CNT is A+1, the received address bits are transferred to an address decoder AR_DECODE, which uses a data multiplexer unit DR_MUX to select an appropriate internal read register. The content of this read register is then copied with a load signal to a shift register SRR, in order to be shifted out at the output DATA with the subsequent clock cycles of the clock signal I2RF_CLK which are generated by the baseband processor. The clock counter CLK_CNT once again counts these clock cycles. In principle, the shift registers SR and SRR may be formed by a single shift register.

Depending on the data transfer direction, the integrated radio-frequency module has to switch the combined input and output DATA to be either an input or an output. At the start of a cycle, the input and output DATA must be switched to be an input in order to allow an incoming message TWB_DATA or I2RF_DATA to be received. If it is confirmed that this is a read access to the integrated radio-frequency module, the input and output DATA must be switched to be an output before the emission of the data that is stored in the shift register SRR. This can be done as soon as the enable line STROBE has been deactivated. After the end of the read access, the input and output DATA must be switched back to being an input again.

Since the clock counter CLK_CNT also counts the clock cycles of the clock signal I2RF_CLK while reading out data, the end of the read access is identified by the clock counter CLK_CNT having reached a specific maximum value. In contrast, the deactivation of the enable line STROBE is in fact a sufficient condition for the end of a write access. The clock counter CLK_CNT is reset to zero again after the end of a bus cycle.

All of the process control and the coordination of the processes described above are carried out by a control unit CONTROL. The control unit CONTROL carries out the necessary control actions as a function of the level of the respective enable signal TWB_DATA_EN_N or I2RF_DATA_EN_N and as a function of the output values of the evaluation unit RW_DECODE. For this purpose, the control unit CONTROL receives from the evaluation unit RW_DECODE signals 3W write, DigRF write and DigRF read, which provide information about the protocol standard and the type of access. In particular, the control unit CONTROL controls the resetting of the clock counter CLK_CNT, the mode of the address/data multiplexer unit ADDR_DATA_MUX, the transfer signal which is emitted by the data multiplexer unit DW_MUX, the load signal and the shift signal for the shift registers SR and SRR, as well as the direction of the combined input and output DATA.

In order to operate it, the control unit CONTROL requires a clock signal, which is present in the integrated radio-frequency module, as the system clock. In principle, the control unit CONTROL could, however, also be designed using self-timed logic, in which case there will be no need for the clock signal that has been mentioned. In order to allow the control unit CONTROL to start its operation at a defined initial state after the integrated radio-frequency component has been switched on, a reset signal is provided, which is generated by a power-on-reset generator within the integrated radio-frequency component.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. An interface circuit, comprising:
a first input configured to receive a clock signal;
a second input configured to receive a data word that is emitted from a control device, the data word including information about a read or write access to the interface circuit;
a third input configured to receive an enable signal comprising a predetermined value during a transmission of the data word to the interface circuit; and
a determination unit configured to determine a digital interface standard on which the data word is being transmitted to the interface circuit based on a number of clock cycles of the clock signal during which the enable signal is at the predetermined value.

2. The interface circuit of claim 1, wherein a word length of the data word depends on the digital interface standard on which the data word is transmitted, and wherein one or more word lengths are predetermined for the digital interface standards.

3. The interface circuit of claim 1, wherein the determination unit is further configured to determine whether a read or a write access is linked to the data word based on a number of clock cycles of the clock signal during which the enable signal is at the predetermined value.

4. The interface circuit of claim 3, wherein the word length of the data word depends on whether a read or a write access is associated with the data word.

5. The interface circuit of claim 1, wherein the determination unit is further configured to determine whether an error has occurred during the transmission of the data word based on a number of clock cycles of the clock signal during which the enable signal is at the predetermined value.

6. The interface circuit of claim 1, wherein the data word comprises address information about the address at which the data to be read or to be written is stored or is intended to be stored, and wherein the data word comprises a predetermined number of address bits.

7. The interface circuit of claim 1, wherein the data word for a write access comprises the data to be written, and wherein the data word comprises a predetermined number of data bits.

8. The interface circuit of claim 1, wherein the data word comprises control information about whether a read or a write access is to be carried out as a function of the interface standard on which the data word is based.

9. The interface circuit of claim 8, wherein the determination unit is further configured to determine whether an error has occurred during the transmission of the data word based on the control information.

10. The interface circuit of claim 1, further comprising a shift register configured to store a received data word to be written.

11. The interface circuit of claim 1, wherein the control device is configured to generate the clock signal.

12. The interface circuit of claim 1, wherein the digital interface standards comprise the 3W Standard and the DigRF Standard.

13. A method for determination of a digital interface standard on which a read or write access by a control device to a circuit is based, comprising:

(a) receiving a clock signal at the circuit;
(b) receiving a data word at the circuit from the control device, the data word including information about a read or write access to the circuit;
(c) receiving an enable signal at the circuit, wherein the enable signal is at a predetermined value during the transmission of the data word; and
(d) determining the digital interface standard on which the transmitted data word is based, based on a number of clock cycles of the clock signal during which the enable signal is at the predetermined value.

14. The method of claim 13, wherein the word length of the data word depends on the digital interface standard on which it is based, and wherein one or more word lengths are predetermined for the digital interface standards which may be used for the transmission of the data word.

15. The method of claim 13, further comprising determining whether a read or write access is associated with the data word based on the number of clock cycles of the clock signal during which the enable signal is at the predetermined value.

16. The method of claim 15, wherein the word length of the data word depends on whether a read or a write access is associated with the data word.

17. The method of claim 13, further comprising determining whether an error has occurred during the transmission of the data word based on the number of clock cycles of the clock signal during which the enable signal is at the predetermined value.

18. The method of claim 13, wherein the data word comprises address information about an address at which the data to be read or to be written is stored or is intended to be stored, and wherein the data word comprises a predetermined number of address bits.

19. The method of claim 13, wherein the data word for a write access comprises the data to be written, and wherein the data word for a write access comprises a predetermined number of data bits.

20. The method of claim 13, wherein the data word comprises control information about whether a read or a write access is carried out as a function of the interface standard on which it is based.

21. The method of claim 20, further comprising determining whether an error has occurred during the transmission of the data word based on the control information.

* * * * *